Sept. 8, 1953
J. C. LANG
2,651,232
FASTENER STRIP
Filed Jan. 14, 1947
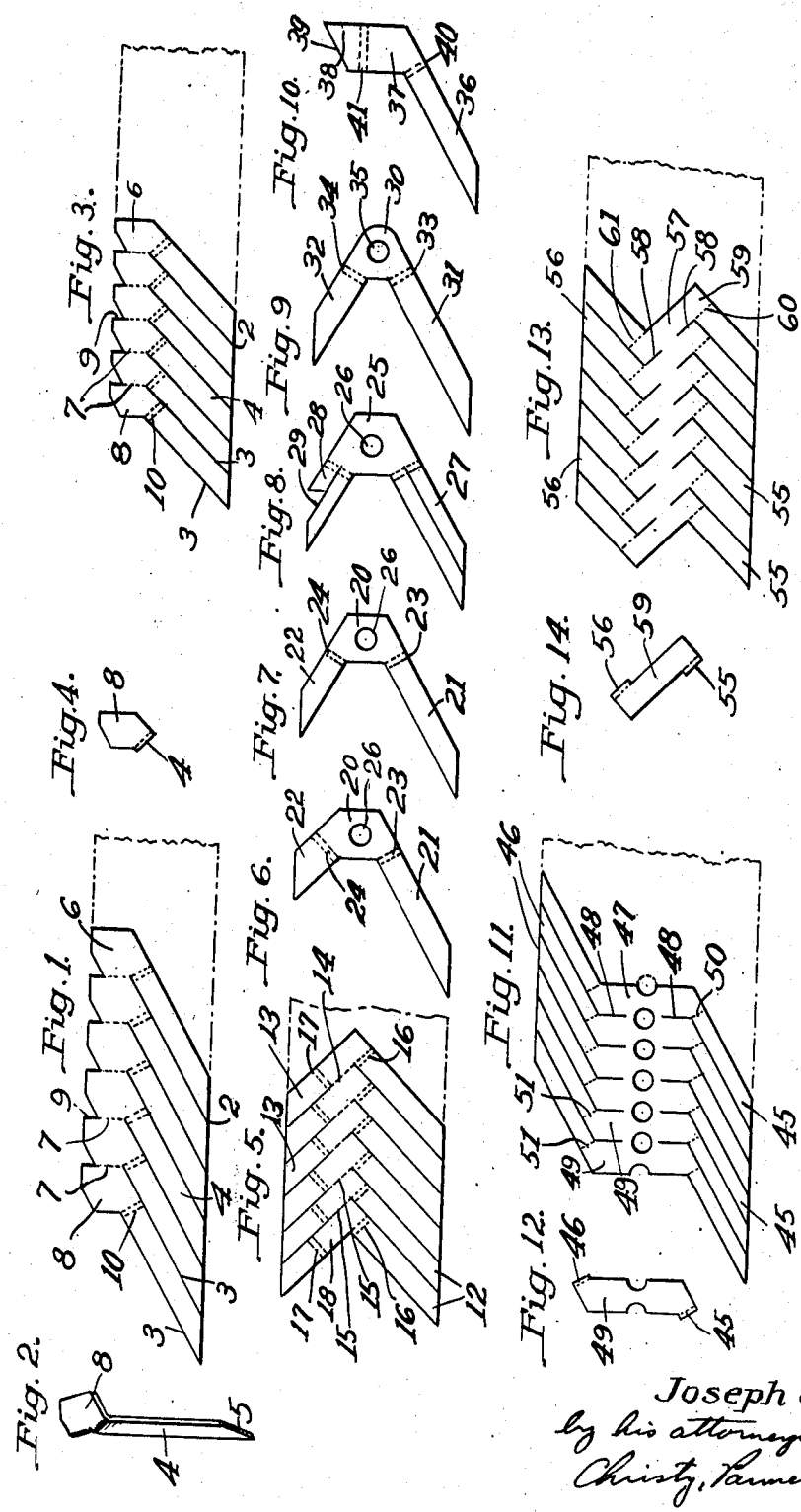
INVENTOR
Joseph C. Lang
by his attorneys Patented Sept. 8, 1953

2,651,232

UNITED STATES PATENT OFFICE 2,651,232

FASTENER STRIP

Joseph C. Lang, Pittsburgh, Pa., assignor to Bocjl Corporation, Pittsburgh, Pa., a corporation of Delaware Application January 14, 1947, Serial No. 721,911

10 Claims. (Cl. 85—17)

This invention is for drive types of fasteners formed from sheet metal and to a connected strip of such fasteners, and to a method of making such fasteners and strips.

According to the present invention the fastener may be embodied in any one of several forms. One form is a simple tack-like fastener having a head portion and leg element; in another form there is a broad portion, a main leg element and an auxiliary leg element; while a third form provides a staple-like fastener having two leg forming elements of equal or nearly equal length. All of them are characterized by being formed from a strip or ribbon of metal stock blanked to provide a succession of fasteners wherein a leg forming element is oblique to both the longitudinal and transverse axes of the strip from which it is made and the leg element of one blank is immediately adjacent the leg element of the next.

The invention provides a unique fastener which can be formed from strip metal with little waste. The strip of metal may be only incompletely blanked out to form a connected series of fastener blanks, which may then be used in a driver which successively separates each blank as it is to be used and completes the formation of the fastener.

The invention contemplates various embodiments, all of which are based on the slitting of a ribbon of metal inwardly from one edge toward the other obliquely to the strip to form a succession of contiguous leg elements, with the leg elements being all joined to a continuous connecting band of metal which may then be severed along lines intersecting the slits at their inner ends. The leg elements are subsequently bent down perpendicularly to the original plane of the metal.

The invention may be more fully understood by reference to the accompanying drawings in which:

Fig. 1 is a plan view of a fastener strip embodying my invention;

Fig. 2 is a perspective view of the finished fastener in the form which it assumes upon being driven;

Fig. 3 is a view similar to Fig. 1 in which the leg forming elements are at a different angle;

Fig. 4 is a top plan view of the fastener shown in Fig. 3;

Fig. 5 is a view similar to Fig. 1 of a further modification in which the head is provided with one primary leg and one secondary leg or short prong;

Fig. 6 shows a modification of the form of fastener illustrated in Fig. 5, a single fastener blank being shown, the strip, however, being developed as shown in Fig. 5;

Fig. 7 is a view similar to Fig. 6 of a slightly modified form in which the leg elements are longer;

Fig. 8 is a view similar to Fig. 7 in which the leg elements are split;

Fig. 9 shows a fastener similar to Fig. 7 in which the head forming portion of the fastener is a rounded polygon;

Fig. 10 shows a fastener similar to Fig. 1, but with a short prong on the head, as well as the principal leg;

Fig. 11 is a view similar to Fig. 1 in which the fastener is in the form of a staple and the leg forming elements extend in opposite directions in the fastener strip;

Fig. 12 is a top plan view of a single fastener cut from the strip Fig. 11, with the leg elements turned down;

Fig. 13 is a view similar to Fig. 11 of a slightly modified form in which the head forming elements of the staple are at an angle to the longitudinal axis of the strip; and Fig. 14 is a top plan view of a single fastener formed from one of the blanks of Fig. 13.

In Fig. 1 the broken lines indicate the dimensions of the original strip of metal from which the fastener strip is formed, as well as indicating that the strip may be of indefinite length, and is not confined to any particular number of fasteners. The strip designated generally as 2 is provided with parallel slits 3 at regular intervals that extend obliquely from one edge of the strip toward, but not through to the other. All of these slits are of equal length so as to form a succession of parallel contiguous leg forming elements 4. Since the slits are at an angle to the edge of the strip, each leg forming element 4 necessarily has a bevelled or pointed end 5.

There is a continuous band of metal 6 at the inner ends of these diagonal slits 3 through which the successive blanks are connected. The single dotted lines 7 indicate the lines of severance along which the continuous band is adapted to be cut to form the individual fastener blanks. Preferably the other edge of the strip is also cut, slitted or notched in some manner, so as to define the head forming elements 8 of the fastener, which head forming elements are the fragments or parts of the continuous band 6 which extend between adjacent severance lines 7. In Fig. 1 the second edge of the strip is cut by notching, the notches being designated 9, so as to reduce the section of the metal in the continuous band 6 which has to be cut along the lines 7 to separate the successive fastener blanks. These notches not only reduce the section of metal and define in part the head forming elements, but they are also made with one transverse edge and one sloping edge providing a ratchet-like notch for indexing or feeding the fastener through a driving machine. A feeder having appropriate ratchet teeth may engage in these notches for advancing the strip, while other notches may be engaged to keep the strip from moving backwards. It will be noted that the lines of severance 7 intersect the slits 3 at their inner ends, and that they also form a continuation of one of the edges of the notches 9. Thus each fastener forming element in the strip has a leg forming element 4 and a head forming element 8 integrally formed from the ribbon of sheet metal with the leg forming element being oblique to the head forming element. The double dotted lines 10 indicate the bending lines for the successive leg forming elements, and in use the leg forming element of the fastener is bent to a plane perpendicular to the plane of the head, forming a complete fastener as shown in Fig. 2 with the leg extending downwardly from one edge of the head, the head in this case being a polygon. If the fastener of Fig. 2 be flattened out to its original plane, one edge of the leg constitutes a straight line continuation of one edge of the polygon, and forms an angular projection on the other edge. Because of the fact that the leg elements extend obliquely of the strip, the legs may be relatively long as compared to the width of the strip, and also because of this disposition of the legs the head forming elements in this instance may be substantially wider than the legs. Viewing the matter another way, if the strip 2 is a rolled metal strip having the general grain structure parallel with the long axis of the strip, the grain in the head forming elements of the finished fastener is parallel with the long axis of the strip, whereas the grain structure in the leg would be oblique to the edges of the leg. If this presents any difficulty, it can be corrected by normalizing the grain structure.

In the form of the invention shown in Figs. 3 and 4, the structure is the same, and the same reference numerals have been used to designate the corresponding parts, but in this case the oblique legs are at a 45° angle to the longitudinal axis of the strip instead of a 30° angle as shown in Fig. 1. This illustrates the adaptability of the invention for making fasteners of different lengths from the same width strip and with slight adjustment of the shearing die.

In the form of invention shown in Fig. 5, the strip is slit from one edge inwardly in the manner hereinbefore described to provide parallel leg forming elements 12. The opposite edge of the strip is slit in a corresponding manner and in the opposite direction to form short prongs or leg elements 13. There is formed between the leg elements and the prong elements 13 a continuous band of metal 14 which is adapted to be severed along the dotted lines 15 to form right angle shaped blanks. The double dotted lines 16 indicate the bending lines 12, while the dotted lines indicate the bending lines for the prong elements 13. A single blank cut from this strip will be of generally L-shaped form with the prong 12 forming an angular extension of the head forming portion 18. It will be bent down on the double dotted line 16 and the prong will be bent down on the double dotted line 17. The prong constitutes a straight modification in this case of the head forming portion. In this form as in Figs. 1 and 4, the principal leg forming elements are formed by slitting the strip obliquely, and the complete fastener is cut from the blank by severing it along lines which intersect the leg forming slits at their inner ends. The opposite edge of the strip is cut, but instead of being notched, is slitted to provide the auxiliary prong elements 13.

In Figs. 6 and 7 there are shown modifications of the form of fastener shown in Fig. 5. The strip would be slitted in substantially the same way in making the blank Figs. 6 and 7, and the strip itself is not shown. Instead of the continuous portion of the strip being severed on diagonal lines, it is severed on transverse lines forming a polygonal shaped head element 20 with a principal leg 21 and an auxiliary prong 22. The double dotted line 23 is the bending line for the leg, and the double dotted line 24 is the bending line for the prong. The only difference between Figs. 6 and 7 in which identical reference numerals have been used is one of proportion and slope of the legs, the prong 22 in Fig. 6 being at a 45° angle, while that of Fig. 7 is at a 30° angle. In Figs. 6 and 7 the head forming element 20 is provided with a central hole 26 and the connected strip of fasteners would be punched to provide such a hole in each blank. This would serve the same purpose as the notches 9 for indexing and feeding the strip through a driving or other form of machine in which the blanks are cut off and bent.

In the modification shown in Fig. 8, the structure is the same as that shown in Fig. 7, except for minor details and proportions, and the leg and prong is slit longitudinally so that in driving the fastener these two parts of both the leg and the prong separate. It will of course be understood that either the leg or the prong might be slit without the other being slitted. In Fig. 8, 25 is the head forming element, 26 is the indexing hole, 27 is the divided main leg, and 28 is the divided prong. It will be noted that in Fig. 8 the edge of the strip has been notched at 29 to illustrate a further way of providing different shaped points on the two parts of the prong to assure of them driving in different directions, and the same expedient could of course be used on the leg 27.

Fig. 9 illustrates a fastener similar to Fig. 7, having a head forming portion 30, a main leg element 31, and an auxiliary leg element or prong 32. The double dotted line 33 is the bending line for the leg 31, and the double dotted line 34 is the bending line for the prong. The head is shown as having a hole 35 similar to that previously described. The difference between Fig. 7 and Fig. 9 is that the blank has been cut from the continuous portion of the strip on a curved line which intersects the leg, instead of a straight line so as to form a rounded polygon.

In the modification shown in Fig. 10, the strip has been slit so that each blank has a main leg element 36, a polygonal head element 37, and a prong element 38. A notch similar to notch 9 of Fig. 1 forms the bevelled edge 39 of the prong. The strip is severed in a transverse direction as in Figs. 1 and 4 to separate a single blank from the strip. The double dotted line 40 is the line of bending for the leg, and the double dotted line 41 is the bending line for the auxiliary prong.

In the form shown in Fig. 12, the strip is slit from one edge inwardly toward the other edge as hereinbefore described to provide a succession of parallel leg elements 45. The other edge of the strip is similarly slit, the slits in this case, however, being parallel with the slits at the other edge to form leg elements 46. Between the leg elements 45 and 46 there is a continuous connecting portion 47 which, however, may be partially slit at 48 inwardly from the ends of the legs along the lines of severance for the individual blanks. The lines of severance would constitute, in this case, continuations of the slits 48. The part of the strip between the legs 46 and 47 constitute the head forming elements 49 of the individual blanks. In this case the strip is also provided with a succession of holes for indexing or feeding the strip, but the holes, instead of being in the center of the head forming portions, are centrally positioned on the lines of severance, so as to further reduce the section of metal that has to be cut in shearing one blank from the next.

The dotted lines 50 indicate the bending lines for the legs 45, and the dotted lines 51 indicate the bending lines for the legs 46. One complete blank bent to shape is indicated in the plan view shown in Fig. 12, where it will be seen that the head is of polygonal form with the turned-down legs 45 and 46 being along two edges of the polygon and the edge of each leg constitutes a continuation of another edge of the polygon. The resulting fastener is a modification of a conventional U-shaped fastener, except that the legs are oblique to the longitudinal axis of the bridge instead of being crosswise as in the conventional staple.

Fig. 14 illustrates another modification along the same line where, however, the lines of severance are at an angle to the longitudinal axis of the strip instead of being transverse as in Fig. 11, Fig. 13 being a combination of the modification shown in Figs. 5 and 11.

In Fig. 13 one edge of the strip is slit inwardly to provide parallel leg forming elements 55, and the opposite edge is slit inwardly to provide leg forming elements 56. The slits along one edge are parallel with those along the other. There is a continuous connecting portion 57, and the strip is slit on lines 58 to partially sever one blank from the next. The lines of severance for any given blank will constitute a continuation of opposed slits 58. The head forming portion 59 of each blank is thus perpendicular to the oblique legs 55 and 56. The bending lines for the legs 55 are indicated by the dotted lines 60, and the dotted lines 61 are the bending lines for the legs 56.

A single completed blank is shown in Fig. 14, where the head forming portion 59 is again a polygon with the two legs 55 and 56 being bent down from two edges of the polygon. One edge of each leg continues upwardly to form another edge of the polygon. The fastener in this case is a U-shaped staple with legs of equal length, but the legs, instead of being transverse to the longitudinal axis of the bridge or head, are parallel.

The several foregoing forms of fasteners which have been described indicate the nature of my invention, and it will be understood that the fastener may be changed in various ways. In all forms of the invention, a succession of fastener blanks is made from a ribbon of metal, slitting the metal obliquely from one edge toward, but not to, the other to form a succession of parallel leg forming elements. By reason of the slits being oblique, the leg forming elements necessarily have a taper, they are relatively long in relation to the width of the strip from which the fasteners are formed, and the leg elements have a disposition with respect to the leg forming elements which is unique and highly desirable for certain applications. It is of course desirable that the width of the connected series of blanks be no greater than necessary in order to reduce the dimensions of the driver, and this is another advantage of the invention.

Also in each of the several embodiments, the lines of separation along which one blank is separated from the next intersect the leg forming slits at an angle so that the leg is always oblique to the head.

In all of the several embodiments illustrated, the leg forming elements merge into a continuous band of metal which serves to unite the strips, and which band of metal is eventually divided to provide the head elements of the individual fastener blanks. In each embodiment illustrated the opposite edge of the strip is cut or slitted in some manner to reduce the section of the continuous metal band, and also aid in the separation of each blank from the next. The cutting of the second edge may, as indicated, also provide indexing notches for use in feeding and positioning the strip in a driving mechanism, while in other cases the slits or cuts in the second edge form second legs or prongs and indexing may be accomplished by a succession of holes formed in the continuous band in the strip. The individual fasteners themselves are unique in construction. They have the leg in all cases offset with respect to the head. One edge of the head constitutes one edge of the leg forming element, and the leg itself bends down from another edge of the head. The head may have various polygonal forms. The length of the leg may be varied by simply changing its inclination, a fact which makes both for economy of manufacture and economy in driving equipment, as one width of blank can provide a variety of fastener shapes and sizes.

I claim:

1. A strip of connected fastener blanks comprising a ribbon of metal that is slit obliquely from one edge toward the other at regularly spaced intervals to form a succession of leg elements, there being a continuous band of metal at which the slits terminate, the strip being adapted to be severed along lines that intersect the slits at their inner ends, the continuous band portion of the strip having regularly-spaced vacant spaces therein, there being one such vacant space for each blank, whereby the strip can be accurately moved into a forming, cutting and driving machine.

2. A strip of connected fastener blanks comprising a ribbon of metal that is slit obliquely from one edge toward the other at regularly spaced intervals to form a succession of leg elements, each having the side edges thereof formed by two slits there being a continuous band of metal at which the slits terminate, the strip being adapted to be severed along lines that intersect the slits at their inner ends, the other edge of the strip being cut from the edge toward the center, the continuous band portion of the strip having regularly-spaced vacant spaces therein, there being one vacant space for each blank, whereby the strip can be accurately moved into a forming, cutting and driving machine.

3. A strip of connected fastener blanks comprising a ribbon of metal that is slit obliquely from one edge toward the other at regularly spaced intervals to form a succession of leg elements, there being a continuous band of metal at which the slits terminate, the strip being adapted to be severed along lines that intersect the slits at their inner ends, the other edge of the strip being cut from the edge toward the center by notches that may index the strip in a feeding mechanism and reduce the section of metal connecting one blank to the next.

4. A prepared strip of fastener blanks for feeding into a forming and driving mechanism comprising an elongated ribbon of metal having a continuous connected margin along one edge thereof, and having its other edge slit obliquely to the edge of the strip from the edge to said continuous margin and providing leg-forming elements positioned side-by-side with respect to one another, the continuous band portion of the strip having regularly-spaced vacant spaces therein, there being one vacant space for each blank, whereby the strip can be accurately moved into a forming, cutting and driving machine utilizing such vacant space for engagement with an indexing means.

5. A prepared strip of fastener blanks for feeding into a forming and driving mechanism comprising an elongated ribbon of metal having a continuous connected margin along one edge thereof, and having its other edge slit obliquely to the edge of the strip from the edge to said continuous margin and providing leg-forming elements positioned side-by-side with respect to one another, the edge of said margin portion being notched at intervals corresponding to the spacing of the said slits.

6. A prepared strip of fastener blanks for feeding into a forming and driving mechanism comprising an elongated ribbon of metal having a continuous connected margin along one edge thereof, and having its other edge slit obliquely to the edge of the strip from the edge to said continuous margin and providing leg-forming elements positioned side-by-side with respect to one another, the edge of said margin portion being indented with regularly-spaced notches that are in transverse alignment with the inner ends of the slits.

7. A strip of connected fastener blanks for feeding into a forming and driving machine comprising an elongated ribbon of metal having parallel edges and a plurality of parallel slits extending inwardly from and forming an acute angle with one of said edges, said ribbon having a continuous band of metal inwardly from said slitted edge with respect to which the material between adjacent slits may be turned to a position perpendicular to the continuous band, the material between each two slits constituting leg elements having parallel side edges and extending obliquely to the longitudinal axis of said strip, the continuous band of the strip having regularly-spaced vacant spaces therein, there being one such vacant space for each blank, whereby the strip can be accurately moved into the forming, cutting and driving machine.

8. A strip of connected fastener blanks for feeding into a forming and driving mechanism comprising an elongated ribbon of metal having a continuous connecting portion and another portion which is regularly slit from one of the side edges of the ribbon inwardly at an acute angle to said edge, the slits terminating at said continuous connecting portion, thereby providing a series of leg-forming elements in side-by-side relationship oblique to the longitudinal axis of the ribbon, the sides of each leg-forming element being defined by a pair of slits, the continuous connecting portion having regularly-spaced vacant spaces formed therein, there being such a vacant space for each complete fastener blank.

9. A strip of connected fastener blanks for feeding into a forming and driving mechanism comprising an elongated ribbon of metal having a continuous connecting portion and another portion which is regularly slit from one of the side edges of the ribbon inwardly at an acute angle to said edge, the slits terminating at said continuous connecting portion, thereby providing a series of leg-forming elements in side-by-side relationship oblique to the longitudinal axis of the ribbon, the sides of each leg-forming element being defined by a pair of slits, the point of the leg-forming element being comprised of the portion of the original edge of the strip, the continuous connecting portion having regularly-spaced vacant spaces formed therein, there being such a vacant space for each complete fastener blank.

10. A strip of connected fastener blanks for feeding into a forming and driving mechanism comprising an elongated ribbon of metal having a continuous connecting portion and which is regularly slit from one of its side edges inwardly at an acute angle to the edge to said continuous connecting portion, thereby providing a series of leg-forming elements in side-by-side relationship oblique to the longitudinal axis of the ribbon, the sides of each leg-forming element being defined by a pair of slits, the point of the leg-forming element being comprised of the portion of the original edge of the strip, and means in the continuous connecting portion of the strip for engagement with an indexing feeder for progressively advancing the strip at regular increments.

JOSEPH C. LANG.

References Cited in the file of this patent

UNITED STATES PATENTS

| Number | Name | Date |
|--------|------|------|
| 312,691 | Woodward | Feb. 24, 1885 |
| 322,997 | Thayer | July 28, 1885 |
| 332,702 | Dean | Dec. 22, 1885 |
| 404,728 | Peterson | June 4, 1889 |
| 410,675 | Raymond | Sept. 10, 1889 |
| 1,247,933 | Colpitts | Nov. 27, 1917 |
| 2,383,135 | Lang | Aug. 21, 1945 |
| 2,438,793 | Vogel | Mar. 30, 1948 |